W. J. ASHER.
SAFETY DEVICE FOR MANGLES.
APPLICATION FILED FEB. 27, 1918.
1,354,872.
Patented Oct. 5, 1920.
2 SHEETS—SHEET 2.
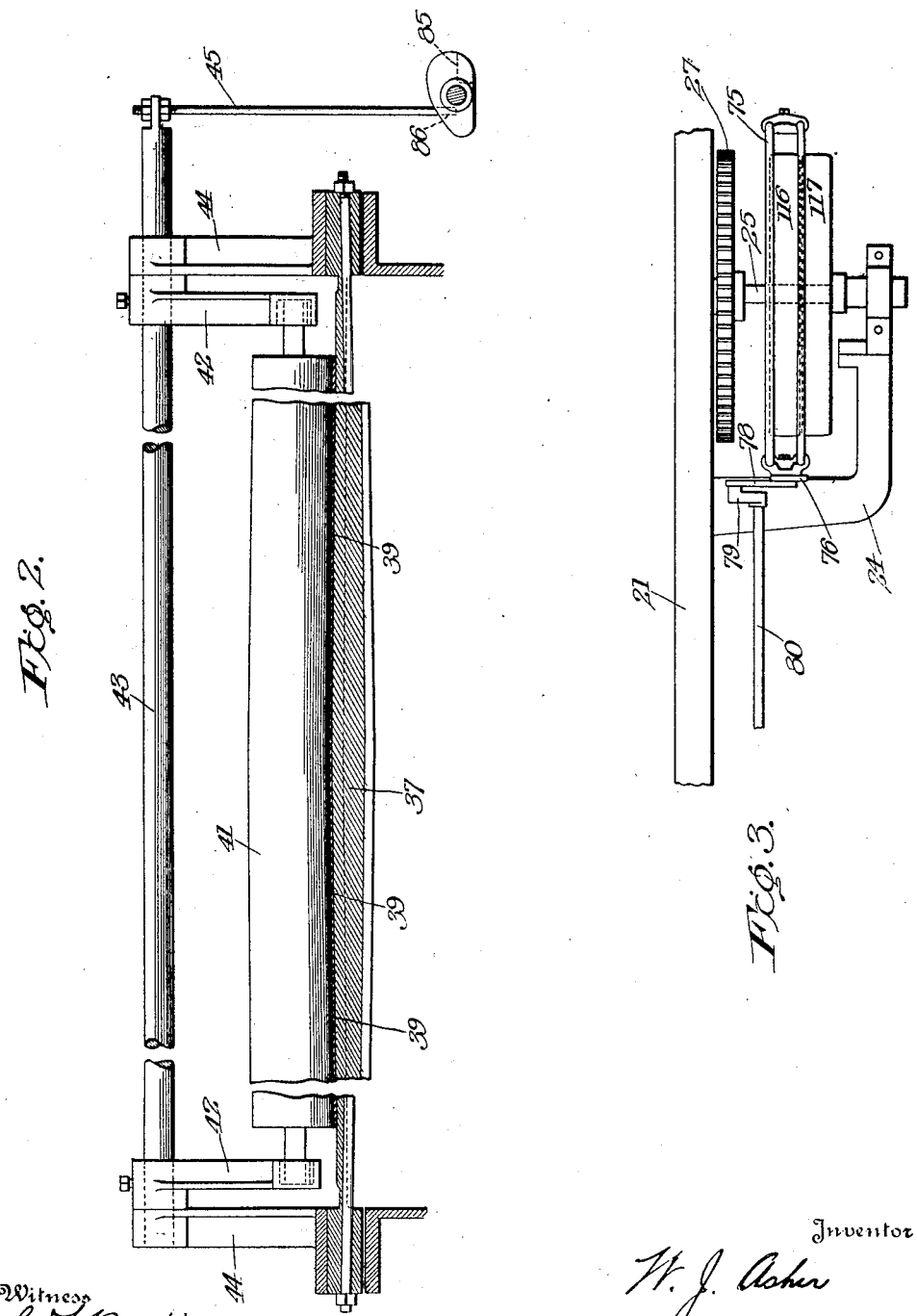

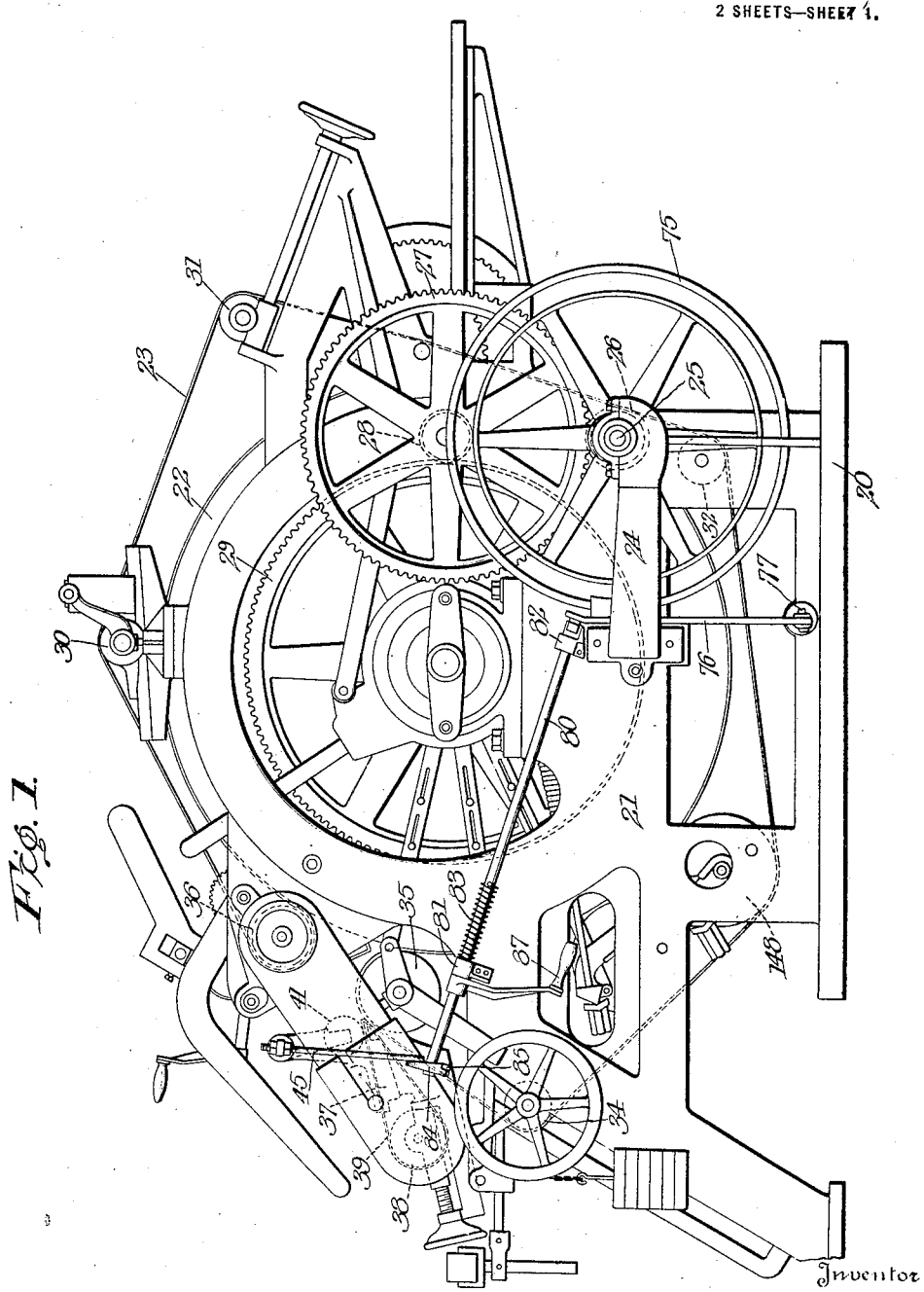

UNITED STATES PATENT OFFICE.

WILLIAM J. ASHER, OF NEWARK, NEW JERSEY.

SAFETY DEVICE FOR MANGLES.

1,354,872.  Specification of Letters Patent.  Patented Oct. 5, 1920.

Original application filed December 14, 1916, Serial No. 137,030. Divided and this application filed February 27, 1918. Serial No. 219,426.

*To all whom it may concern:*

Be it known that I, WILLIAM J. ASHER, a citizen of the United States, residing at Newark, in the county of Essex, State of New Jersey, have invented certain new and useful Improvements in Safety Devices for Mangles, of which the following is a specification.

This application which is a division of my application No. 137,030 filed December 14, 1916, relates to a safety device especially adapted to be used on such apparatus as ironing or similar machines. The principal object of the invention is to provide a device for throwing off the driving power to the machine in case the operator's fingers are drawn between the feed roll and feed board or too thick a piece of work is attempted to be introduced into the machine. Other objects will be apparent from the description taken in connection with the drawings in which, Figure 1 is a side elevation of a mangle or ironing machine showing the safety device as applied thereto;

Fig. 2 is a section in elevation through the feed board and showing the feed roller and the method of mounting the same;

Fig. 3 is a fragmentary plan view showing the driving and driven pulleys and the crank on the end of the spring actuated rod for actuating the belt shifting means.

The machine in connection with which I have illustrated the safety device comprises a base 20 having the side frames 21 between which is rotatably mounted the steam drum 22 which has a smooth periphery around which the material to be ironed is adapted to be carried by an endless apron 23. A bracket 24 is attached to one of the side frames 21 and carries a shaft 25 on which are mounted the tight and loose pulleys 116 and 117, by means of which the entire machine is driven. The shaft 25 carries a pinion 26 which meshes with a spur gear 27, and mounted on the same axis and adapted to rotate with the latter is a pinion 28 which in turn drives the spur gear 29 rigidly connected with the drum. As shown in Fig. 1, the endless apron passes over a roller 30 at the top of the machine, then around an adjustable roller 31, thence downward and successively around the rollers 32, 148 and 34 to the roller 35, then around the periphery of the drum to roller 36 which is located near and parallel to the roller 35 and finally returning to roller 30. The material to be ironed is fed in over the roller 35 from a feed table 37 shown in dotted lines in Fig. 1. As shown in this figure, the upper surface of the feed table is arranged substantially tangential to the roller 35 and has a roller 38 rotatatively mounted in front of the same so that the said surface is also tangential to the latter roller. A series of tapes 39 are arranged to pass around the roller 38 over the top surface of the feed table, and around the forward edge of the same returning underneath the table to the roller. A feed roller 41 is arranged above the table and adapted to coöperate with the tapes 39 so that the material to be ironed is fed to the machine between said roller and the tapes. As shown in Fig. 2, this roller is rotatively mounted at its ends in the arms 42, which in turn are rigidly carried by the shaft 43 supported by the brackets 44 on the side frames. The shaft 43 projects laterally from one side of the machine and carries a depending rod or latch member 45 for a purpose later to be described.

As shown in plan in Fig. 3 and in elevation in Fig. 1, the belt is adapted to be shifted from the loose pulley 116 to the tight pulley 117 by a shifter 75 which is supported by an arm 76 pivoted at its lower end as at 77. The upper end of this arm is connected by means of a link 78 with a crank 79 rigidly fastened to the rod or rock shaft 80 which is carried by one of the side frames of the machine by means of the bearings 81 and 82. A torsion spring 83 is coiled around a portion of the rod 80 and has one end thereof connected to the bearing 81 and the other end to the shaft, the arrangement being such that when the spring is placed under tension it tends to turn the rod 80 in such a direction as to shift the belt from the tight to the loose pulley. At its upper end the rod 80 is provided with a disk 84 which has a notch 85 and a stop shoulder 86 formed therein which are adapted to coöperate with the end of the rod or latch member 45 carried by the shaft 43.

When the belt is shifted from the loose to the tight pulley by means of the handle 87 to start the machine the torsion spring 83 will be stressed and the rod 80 turned so that the notch 85 will register with the end of the rod 45, thereby latching the rod 80 with the torsion spring 83 in tensioned position. If for any reason the feed roller 41 is swung out of position it will move the rod 45 out of the notch 85, thereby permitting the torsion spring 83 to exert its energy and throw the belt from the tight to the loose pulley, thus throwing off the driving means and stopping the machine.

Although this device has been shown and described in connection with a particular form of ironing machine, it is obvious that it is adapted for other types of machines and that many changes may be made therein without departing from the spirit of the invention. For example although a machine driven by means of a belt has been shown and described it is obvious that the safety device is adapted for use in connection with machines driven in other ways.

Having thus described the invention, what is claimed and desired to be secured by Letters Patent is:

1. In a mangle, a feed board, a feed roll coöperating with said board, a shaft above the roll, depending arms on said shaft having a bearing for the roll, driving means for the mangle, a rotatably mounted rod having a crank, a spring tending to rotate said rod, connections between the crank and driving means whereby rotation of the rod throws off the driving means, and an arm on said shaft releasably engaging the rod for holding the spring tensioned and adapted to be released by swinging movement of the feed roll.

2. In a mangle, a feed board, a feed roll coöperating with said board mounted to be displaced when a relatively thick object comes between the roll and board, means to drive the mangle, a rotatably mounted rod, a spring associated with said rod, a latch member movable with said roll when the latter is displaced adapted to releasably hold said rod with the spring under tension, and means operated by rotation of said rod when the latch is released to throw off said mangle driving means.

3. In a mangle, a feed board, a feed roll coöperating with said board, means supporting said roll for swinging movement when an abnormally thick object comes between the roll and board, means to drive the mangle, a spring actuated member tending to throw off said driving means, and a latch element associated with the roll supporting means releasably engaging said member, whereby the member is released and the driving means thrown off when the roll is swung out of position.

4. In a mangle, a feed board, a feed roll coöperating with said board to feed goods to the mangle, means supporting said roll for displacement when an abnormally thick object comes between the roll and board, means to drive the mangle, a member adapted to throw off said driving means, means normally forcing said member in the throw off direction, and an element associated with the first mentioned means releasably engaging said member adapted to release said member when the roll is displaced.

5. In a mangle, in combination, driving means, a rotatively mounted rod, spring means arranged to rotate said rod to throw off the driving means, a feed roll mounted for rotation about its own axis and for swinging movement about an axis exterior thereto, and latching means under the control of said roll adapted to hold said spring means stressed and to be released by swinging movement of said roll, said latching means including an arm directly movable with said roll in its swinging motion and a member on said rod directly engaged by said arm.

In testimony whereof I affix my signature.

WILLIAM J. ASHER.